United States Patent

[11] 3,629,523

[72] Inventor Christian Chalhoub
33 rue Lecourbe, Paris, France
[21] Appl. No. 860,746
[22] Filed Sept. 24, 1969
[45] Patented Dec. 21, 1971
[73] Assignee C.I.T. Compagnie Industrielle des Telecommunications, Paris, France
[32] Priority Sept. 25, 1968
[33] France
[31] 167602

[54] REPEATER FOR A TRANSMISSION LINE AND A METHOD OF MONITORING THE REPEATER IN THE LINE

13 Claims, 2 Drawing Figs.

[52] U.S. Cl. 179/175.31, 179/170 F, 178/69 G
[51] Int. Cl. H04b 3/46, H04l 25/02
[50] Field of Search 178/69 G, 71; 179/170 A, 170 F, 175.31

[56] References Cited
UNITED STATES PATENTS

| | | | |
|---|---|---|---|
| 3,049,596 | 8/1960 | Sonneborn | 179/175.31 |
| 3,311,714 | 3/1967 | Howson | 179/175.31 |
| 3,482,059 | 12/1969 | Tilly | 179/175.31 |

*Primary Examiner*—Kathleen H. Claffy
*Assistant Examiner*—William A. Helvestine
*Attorney*—Craig, Antonelli and Hill ABSTRACT: Each repeater is fitted with a transmitter of a characteristic frequency located in the interband range of a $n + n$ high-band and low-band link. By combining with a measuring frequency in the low band transmitted from the terminal station A, the nonlinearity of the repeater gives rise to a frequency in the high band which is received and measured in this same terminal station A.

INVENTOR
CHRISTIAN CHALHOUB

BY Craig, Antonelli & Hill
ATTORNEYS

REPEATER FOR A TRANSMISSION LINE AND A METHOD OF MONITORING THE REPEATER IN THE LINE

The invention relates to a repeater for a transmission line and a method for the remote monitoring of the nonlinearity of the repeater fitted to the transmission line, whose use offer advantages in many types of carrier-current links, and particularly, but not exclusively, in telephone links by submarine cable. While the degree of nonlinearity of an overland repeater can be measured in the corresponding repeater station, in a submarine link this measurement can be effected only by telemetry from a terminal station.

Devices for the remote measurement of the gain of a repeater fitted to a N+N-type transmission line are already known, and can be fitted to a submarine cable link to permit telemetry of the gain of the line between a terminal station and the output of each of the amplifiers of the link.

A precise knowledge of the state of the link requires not only the knowledge of the value of the gain at the time of the measurement, but also any tendency to vary which it may have. Generally the amplifiers are provided with strong negative feedback intended to improve their gain stability and to diminish their degree of harmonic distortion. An effect of this negative feedback is to mask variations of the intrinsic gain factor of the repeater by its compensation for the effects on the overall gain. If the intrinsic gain factor has diminished strongly, for example because of aging or the development of a fault, the measurement of the gain does not show this to an appreciable extent until the fault has become serious, with possibly dangerous consequences with regard to the serviceability of the repeater. It is useful to obtain a warning much sooner, in order to take necessary measures before an abnormal variation of a component reaches a dangerous level where it can put the whole link out of service.

Monitoring in this way is made possible by the measurement of the degree of nonlinear distortion of each amplifier, since this parameter is inversely proportional to the energy injected in negative feedback into the amplifier in question, that is, to the intrinsic gain factor. Consequently, if a strongly increased distortion rate is observed with a gain which has not shown an appreciable variation, an indication is immediately obtained of an unfavorable development in a repeater.

A number of solutions to the problem of remote measuring of the nonlinearity of repeaters have been proposed.

In a first proposal, an identification frequency characteristic of a particular repeater is applied to its input while a measuring frequency is applied at the terminal station where the link originates. For example, a measuring frequency $f_{mn}$ is passed through the whole of the link, while a locally produced individual identification frequency is applied to the input of each repeater.

The measurement is carried out each time on a frequency produced by intermodulation.

This proposal gives satisfactory results in overland links with at the most eight to 15 repeaters between stations. However, it cannot be applied to a line fitted with a great number of repeaters, since the intermodulation between the signals $f_{mn}$ and $f_{in}$ is also produced in all repeaters beyond repeater $n$, which makes the measurement increasingly imprecise as the repeaters become further away from the terminal station where the measurement is carried out. Moreover, a submarine link may have up to a hundred repeaters. Thus, this proposal is unsuitable for use on a submarine link of some length.

Another proposal suitable for use on two-band N+N-type links such as submarine cables, consists in transmitting from a terminal station A providing a low frequency transmission band and high frequency reception band short "gating pulses" at a low-band frequency, and receiving and measuring at the same terminal station a frequency in the high band generated by the nonlinearity of a repeater.

Here, the operation depends on propagation time. For a propagation time of the order 10 $\mu$ per nautical mile, and a mean distance between repeaters of for example 20 nautical miles, the propagation time between the terminal station and the first repeater is 200 $\mu$. Thus, a time of 0.4 ms. elapses between the transmission of the gating pulse and the return of the gating pulse caused by the nonlinearity. The gating pulses received back from the various repeaters arrive at intervals of approximately 0.4 ms. Thus, each of the return gating pulses makes it possible to identify and to measure the nonlinearity of a given repeater.

The rate of transmission of the gating pulses must be slightly higher than the propagation time back and forth over the whole length of the cable.

This arrangement requires a rather complicated apparatus and provides relatively low precision, since the level of the basic signal is not known exactly for each particular nonlinearity neither is the gain of the link at the harmonic frequencies and between the sites of nonlinearity and measuring site.

In accordance with the invention there is provided a repeater for use in a transmission line to transmit a high-frequency band in one direction and a low-frequency band in the opposite direction, the high and low-frequency bands being separated by an untransmitted intermediate band of frequencies, the repeater having a remote monitoring facility and including first circuitry for supplying a characteristic frequency $f_c$ in the intermediate band, second circuitry for supplying an identification frequency $f_i$ in the high-frequency band, an element for applying the characteristic and identification frequencies to the input of an amplifier of the repeater, and a filter element for separating from the amplifier a constant frequency $f_d$, where $f_d$ is equal either to $(f_c+f_m)$ or to $(f_c-f_m)$, for being a monitoring frequency transmitted in one of the transmitted frequency bands by a terminal station of the transmission line, and $f_d$ being in the other transmitted frequency band.

The invention also includes a transmission cable incorporating a repeater as set out above, and also covers a method of monitoring the nonlinearity of a repeater in a transmission line for transmitting a high-frequency band in the direction and a low-frequency band in the opposite direction, the high and low-frequency bands being separated by an untransmitted intermediate band of frequencies, in which system the repeater has a remote monitoring facility and includes first circuitry for supplying a characteristic frequency $f_c$ in the intermediate band, second circuitry for supplying an identification frequency $f_i$ in the high-frequency band, an element for applying the characteristic and identification frequencies to the input of an amplifier of the repeater, and a filter element for separating from the amplifier output a constant frequency $f_d$, where $f_d$ is equal either to $(f_c+f_m)$ or to $(f_c-f_m)$, $f_m$ being a monitoring frequency transmitted in one of the transmitted frequency bands by a terminal station of the transmission line, and $f_d$ being in the other transmitted frequency band.

Using the invention it is possible to provide remote monitoring of nonlinearity of the repeaters of a transmission line and it is possible to carry out a relatively precise measurement with a relatively simple apparatus.

This is achieved by exploiting the existence of the untransmitted intermediate band of frequencies between the low-frequency band transmitted in one direction and the high-frequency band transmitted in the other direction.

The measuring frequencies advantageously selected in the low-frequency band and the frequency $f_d$ in the high-frequency band, since the negative feedback in the repeater is less in the high-frequency band. This is because the intrinsic gain factor is smaller, and the negative feedback must be less to ensure equality of the gain, and also because the attenuation of the cable increases at higher frequencies, requiring an increase in the gain of the repeater.

Thus, the degree of nonlinearity increases faster in the high-frequency band than in the low in the event of a fault.

The invention will now be described in more detail, by way of example, with reference to the accompanying diagrammatic drawing, in which.

The example to be described refers to an N+N link with 540 channels, comprising supergroups 2 to 9.

Figure 1:
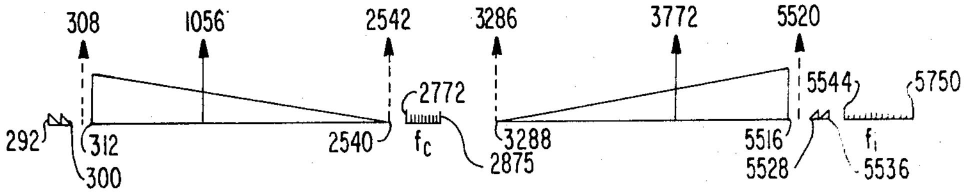
FIG. 1 is a frequency diagram.

Referring to FIG. 1, a low-frequency band extends from 312 to 2,540 kHz. with a permanent pilot tone at 1,056 kHz. and two accessory control frequencies of 308 and 2,542 kHz. respectively. Two service channels are shown between 292 and 300 kHz.

A high-frequency band covers 3,288–5,516 kHz. with a permanent pilot tone at 3,772 kHz. and two accessory control frequencies of 3,286 and 5,520 kHz. Two service channels are shown between 5,528 and 5,536 kHz.

The untransmitted intermediate band lies between 2,542 and 3,286 kHz.

The identification frequencies $f_i$, which are specific to each repeater and allow monitoring of the gain of each repeater, cover a band of 5,544 to 5,750 kHz. These frequencies are spaced by increments of 0.5 kHz. Each of these locally generated frequencies $f_i$ is applied to the input of each amplifier of the line.

There is also generated locally in each repeater a characteristic frequency $f_c$ intended for the measurement of nonlinearity. The band of characteristic frequencies $f_c$ covers 2,772–2,875 kHz. The characteristic frequencies, spaced by increments of 0.25 kHz. are located within the intermediate band. Thus, a particular characteristic frequency $f_{cn}$ is not transmitted by its corresponding repeater *n;* it can be detected only by means of the intermodulation products which it produces with the corresponding measuring frequency $f_{mn}$.

Figure 2:
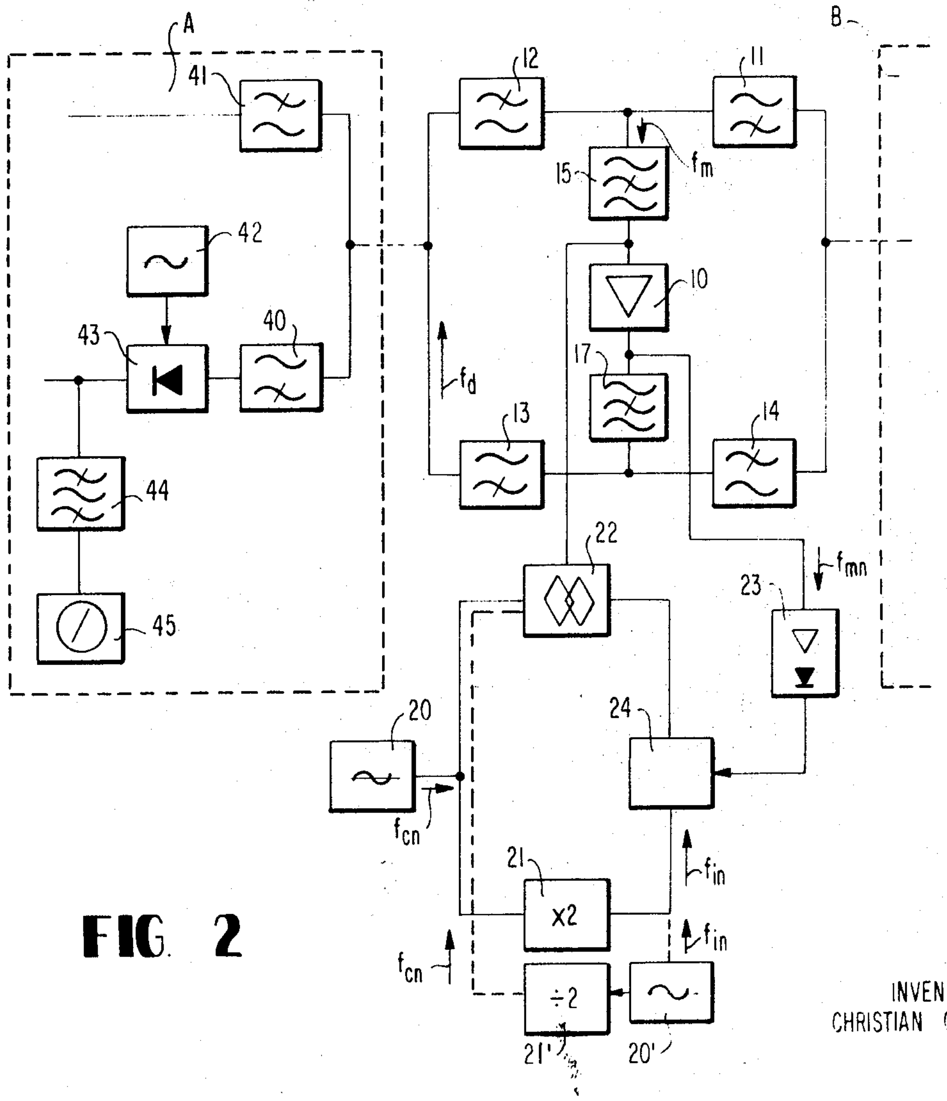
FIG. 2 is a block diagram of a device for the remote measurement of the nonlinearity of a transmission line-repeater.

With regard to the choice of characteristic frequencies, two cases have to be considered, and will now be examined with reference to FIG. 2, which shows a portion of a terminal station A and of a repeater *n*.

The repeater *n* comprises a line amplifier 10, two identical low-pass filters 12 and 14 with a cutoff frequency of 2,542 kHz. and two identical high-pass filters 11 and 13, having a cutoff frequency of 3,286 kHz.

The repeater further comprises two identical band-pass filters 15 and 17, which diminish the loop gain of the repeater enough to ensure stability in the zone where the sum of the attenuations of the filters 11 to 14 does not exceed 2 to 3 nepers.

At the center of the intermediate band, between 2,850 and 2,950 kHz. the filters 15 and 17 raise the attenuation to a minimum of approximately 6 nepers. Under these conditions, the characteristic frequencies are selected in the 2,850–2,950 kHz. band.

A repeater *n* could be provided with an oscillator for the identification frequency $f_{in}$ and an oscillator for the characteristic frequency $f_{cn}$. However, a simplification can be achieved, by taking for each characteristic frequency $f_{cn}$ a fraction of the corresponding identification frequency $f_{in}$, and providing each repeater with a single oscillator of frequency $f_{cn}$ and a frequency multiplier to supply the frequency $f_{in}= a\times f_{cn}$.

Alternatively, the apparatus may comprise an oscillator 20′ for the frequency $f_i$ and a frequency divider 21′ for $f_c$, shown connected in dotted line form in FIG. 2. When the fraction is ½ and $f_{cn}=2f_{in}$ with the band of identification frequencies at 5,544–5,750 kHz. there would be a corresponding band of characteristic frequencies at 2,772–2,875 kHz. This arrangement necessitates an adjustment of the band-pass filters 15 and 17, to extend their attenuated band down to 2,772 kHz. instead of 2,850 kHz. This can be achieved by associating with the filters 15 and 17 supplementary filters (not shown in FIG. 2).

Using the second arrangement described above, the following values for the various frequencies are obtained:

Measuring frequency $f_m$ $(=f_d-f_c)$: 2,400–2,503 kHz. band, for example 2,475 kHz. for a particular repeater.

Characteristic frequency $f_c$: 2,772–2,875 kHz. band, for example 2,800 kHz. for the particular repeater mentioned above.

Control frequency $f_d$=5,275 kHz. (constant).

FIG. 2 shows an oscillator 20 of frequency $f_{cn}$, connected to a frequency doubler 21 which supplies the frequency $2f_{cn}=f_{in}$, and to an input element 22 for applying the frequencies $f_c$ and $f_i$ to the input of the amplifier 10. The measuring frequency is $f_{mn}$.

A detector amplifier 23 connects the output of amplifier 10 to an amplitude selector 24 which cuts off the identification frequency $f_{in}$ when the level of the carrier at the output of the amplifier 10 has a predetermined value.

FIG. 2 shows that portion of the equipment of the terminal station A including: a low-pass filter 41 with its input connected in parallel with that of a high-pass filter 40; an oscillator 42 supplying a transposition frequency of 5,828 kHz. to a modulator 43; and a passband filter 44 centered on 553 kHz. and connecting a voltmeter 45 to the output of modulator 43.

The mode of operation is as follows:

For calibration a signal of frequency $f_d$, 5,275 kHz. is transmitted from station B.

When the frequency $f_{in}$ is cut off the level at the output of amplifier 10 is $N_m$. In this manner, from the reading in meter 45, it is possible to determine the gain of the line between the output of amplifier 10 and the station A and at the frequency $f_d$=5,275 kHz. the measurement being carried out in meter 45 at a frequency of 553 kHz. after transposition. For monitoring, a signal $f_{mn}$ is transmitted from station A, for example at 2,475 kHz. at the level at which $f_{in}$ is cut off. $F_{in}$ is, for example, 5,600 kHz. The second order distortion product at a frequency $f_d=f_{mn}+f_{cn}$ (2,475+2,800=5,275 kHz. appears at the output of the amplifier 10 at a level $N_h$, which can be deduced from the measurement in meter 45 after such calibration as just described.

Knowing $N_m$, $N_h$, and also $N_c$ the permanent transmission level of $f_c$ at the output of the line amplifiers, the degree of harmonic distortion of the amplifier 10 can be easily calculated.

What I claim is:

1. A repeater for use in a transmission line having an amplifier and filter means to transmit a high-frequency band in one direction and a low-frequency band in the opposite direction, the high-and-low frequency bands being separated by an untransmitted intermediate band of frequencies, the repeater having a remote monitoring facility and including first circuit means for supplying a characteristic frequency $f_c$ in the intermediate band, second circuit means for supplying an identification frequency $f_i$ in the high-frequency band, an element connected to said first and second circuit means for applying the characteristic and identification frequencies to the input of said amplifier of the repeater, and filter element for separating from the amplifier output a constant frequency $f_d$, where $f_d$ is equal to $(f_c+f_m)$ or $(f_c-f_m)$, $f_m$ being a monitoring frequency transmitted in one of the transmitted frequency bands by a terminal station of the transmission line, and $f_d$ being in the other transmitted frequency band.

2. A repeater as claimed in claim 1, in which said first circuit means comprises an oscillator for providing the frequency $f_c$ and said second circuit means comprises a frequency multiplier for providing the frequency $f_i$ by multiplication of the frequency $f_c$.

3. A repeater as claimed in claim 1, in which said second circuit means comprises an oscillator for providing the frequency $f_i$ and said first circuit means comprises a frequency divider for providing the frequency $f_c$ by division of the frequency $f_i$.

4. A repeater as claimed in claim 2, in which the frequency multiplier is adapted to multiply by two, whereby $f_i=2\times f_c$.

5. A repeater as claimed in claim 3, in which the frequency divider is adapted to divide by two, whereby $f_i=2\times f_c$.

6. A repeater as claimed in claim 1, in which $f_d=f_m+f_c$, $f_m$ is in the low-frequency band and $f_d$ is in the high-frequency band.

7. In combination with a transmission cable having at least one terminal station and a plurality of repeaters each comprising an amplifier and filter means for passing a high-frequency band in one direction through the repeater and a low-frequency band in the opposite direction through the repeater, the high and low-frequency bands being separated by an untransmitted intermediate band of frequencies, and a monitoring facility connected to each repeater including first circuit means for supplying a characteristic frequency $f_c$ in the intermediate band, second circuit means for supplying an identification frequency $f_i$ in the high-frequency band, an element connected to said first and second circuit means for applying said characteristic and identification frequencies to the input of said amplifier of the associated repeater, each repeater including a filter element connected to the output of said amplifier for separating from the amplifier output a constant frequency $f_d$, where $f_d$ is equal to $(f_c+f_m)$ or $(f_c-f_m)$, $f_m$ being a monitoring frequency transmitted in one of said high or said low-frequency band by said terminal station and $f_d$ being in the other of said high or said low-frequency band.

8. The combination defined in claim 7, Wherein said terminal station includes testing means for testing the gain of said repeater at said constant frequency $f_d$.

9. The combination defined in claim 8, wherein said monitoring facility further includes amplitude-selecting means, connected between said second circuit means and said element for applying said characteristic and identification frequencies to the input of said amplifier and responsive to the output signal level of said amplifier, for blocking said identification signal when the output level of said amplifier reaches a prescribed value.

10. A repeater as claimed in claim 7, in which said first circuit means comprises an oscillator for providing the frequency $f_c$ and said second circuit means comprises a frequency multiplier for providing the frequency $f_i$ by multiplication of the frequency $f_c$.

11. A repeater as claimed in claim 7, in which said second circuit means comprises an oscillator for providing the frequency $f_i$ and said first circuit means comprises a frequency divider for providing the frequency $f_c$ by division of the frequency $f_i$.

12. A repeater as claimed in claim 7, in which $f_d=f_m+f_c$, $f_m$ is in the low-frequency band and $f_d$ is in the high-frequency band.

13. A method of monitoring the nonlinearity of a repeater in a transmission line having an amplifier and filter means for transmitting a high-frequency band in one direction and a low-frequency band in the opposite direction, the high and low-frequency bands being separated by an untransmitted intermediate band of frequencies, comprising the steps of applying to the input of said amplifier a characteristic frequency $f_c$ in the intermediate band and an identification frequency $f_i$ in the high-frequency band, applying to one end of said repeater a constant frequency $f_d$, cutting-off the identification frequency $f_i$ when the level of the signal at the output of said amplifier has a predetermined value, measuring the gain of the line at the other end of the repeater when the frequency $f_i$ is cut off, removing said frequency $f_d$ from said one end of said repeater, applying to the other end of the line a frequency $f_m$ wherein $f_d=(f_c+f_m)$ or $(f_c-f_m)$, $f_m$ being a monitoring frequency in one band and $f_d$ being in the other band of said high and low bands, and $f_m$ having a level corresponding to the level at which the identification frequency $f_i$ is cut off, and measuring the level of the frequency $f_d$ received as a modulation product at said other end of said repeater.

* * * * *